United States Patent
Cantrill et al.

(10) Patent No.: US 10,263,993 B2
(45) Date of Patent: *Apr. 16, 2019

(54) ACCESS GUARDS FOR MULTI-TENANT LOGGING

(71) Applicant: Red Hat, Inc., Raleigh, NC (US)

(72) Inventors: Jeffrey Jon Cantrill, Wilmington, NC (US); Eric M. Wolinetz, Chicago, IL (US); Luke R. Meyer, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/875,614

(22) Filed: Jan. 19, 2018

(65) Prior Publication Data
US 2018/0159861 A1 Jun. 7, 2018

Related U.S. Application Data

(63) Continuation of application No. 15/053,435, filed on Feb. 25, 2016, now Pat. No. 9,900,317.

(51) Int. Cl.
*G06F 17/30* (2006.01)
*G06F 21/62* (2013.01)
*H04L 29/06* (2006.01)

(52) U.S. Cl.
CPC ...... *H04L 63/101* (2013.01); *G06F 17/30946* (2013.01); *G06F 21/6218* (2013.01); *H04L 63/105* (2013.01)

(58) Field of Classification Search
None
See application file for complete search history.

(56) References Cited

U.S. PATENT DOCUMENTS 7,930,760 B2 * 4/2011 Coles .................. G06F 21/6227
726/27
8,713,693 B2 4/2014 Shanabrook et al.
(Continued)

FOREIGN PATENT DOCUMENTS

CN 103399887 A 11/2013
CN 104036025 A 9/2014
(Continued)

OTHER PUBLICATIONS

"Elasticsearch acess control based on field value", Stack Overflow, 5 pages (http://stackoverflow.com/questions/29170777/elasticsearch-access-control-based-on-field-value).
(Continued)

*Primary Examiner* — Christopher A Revak
(74) *Attorney, Agent, or Firm* — Lowenstein Sandler LLP

(57) ABSTRACT

A multi-tenant logging system that allows a user to have an individual profile that controls the user's access to tenant logs is provided. The system includes a plugin that adds features of an access control list (ACL) to indexes of a logging stack based on a user's access role. The stack is an aggregate of logs for nodes that are stored globally in the system. When a user requests a particular index to logs in the logging stack, an authorization token associated with the user is provided. Before the user request is allowed to proceed, the access guard plugin performs access control on the stack by referencing the ACL using the authorization token to determine which tenants a user can access in view of the user's current access role. The plugin uses the token and the user identifier to construct the ACL to enable each user's access to the stack.

20 Claims, 5 Drawing Sheets

(56) References Cited

U.S. PATENT DOCUMENTS

| | | |
|---|---|---|
| 8,769,644 B1 | 7/2014 | Eicken et al. |
| 8,839,209 B2 | 9/2014 | Gallagher et al. |
| 9,098,675 B1 | 8/2015 | Roth et al. |
| 9,418,213 B1 | 8/2016 | Roth et al. |
| 9,774,586 B1 | 9/2017 | Roche et al. |
| 9,900,317 B2 * | 2/2018 | Cantrill ................ H04L 63/101 |
| 2009/0288084 A1 | 11/2009 | Astete et al. |
| 2010/0286992 A1 | 11/2010 | Tkatch et al. |
| 2015/0058950 A1 | 2/2015 | Miu |
| 2015/0059003 A1 | 2/2015 | Bouse |
| 2015/0205974 A1 | 7/2015 | Talley et al. |
| 2015/0355879 A1 | 12/2015 | Beckhardt et al. |
| 2017/0116403 A1 | 4/2017 | Bouse et al. |
| 2017/0147808 A1 | 5/2017 | Kravitz |
| 2017/0178127 A1 | 6/2017 | Kravitz |
| 2017/0213210 A1 | 7/2017 | Kravitz |
| 2017/0235936 A1 | 8/2017 | de los Rios et al. |

FOREIGN PATENT DOCUMENTS

| | | |
|---|---|---|
| CN | 105071966 A | 11/2015 |
| CN | 105243008 A | 1/2016 |

OTHER PUBLICATIONS

Philipp R., "Elasticsearch access control based on field value," 1 page (https://groups.google.com/forum/#!msg/elasticsearch/D9bNsCeYdpc/Ka715_GblzMJ).

"Protect your Data with Shield", Shield | Security for Elasticsearch, 2016, 4 pages.

Alex Brasetvik, "Securing Your Elasticsearch Cluster", Elastic Dec. 9, 2013, 11 pages.

"Solve the Nosy Neighbor Problem in Multi-Tenant Environments", HyTrust: Solution Brief, 2015, 7 pages.

"Search Guard Security Plugin for ES 1.x—Elasticsearch Security for Free", GitHub, Floragunncom/search-guard, 9 pages.

J. Cantrill, "Dynamic sync of ACL based on incoming token and user", GitHub, Sep. 10, 2015, 31 pages.

* cited by examiner

ACCESS GUARDS FOR MULTI-TENANT LOGGING

RELATED APPLICATIONS

This application is a continuation of U.S. patent application Ser. No. 15/053,435, filed Feb. 25, 2016, the entirety of which is incorporated herein by reference.

TECHNICAL FIELD

The implementations of the disclosure relate generally to computing infrastructures and, more specifically, relate to access guards for multi-tenant logging.

BACKGROUND

A "tenant" in a multi-tenant system is a defined set of computing resources with access privileges provided to a set of users and protected from access by other users in the system. A typical multi-tenant system is comprised of tenants that can range in size from one instance of an application to a set of inter-related and replicated applications. The multi-tenant system is designed to allow the users to share resources for the applications within these tenants.

BRIEF DESCRIPTION OF THE DRAWINGS

The disclosure can be understood more fully from the detailed description given below and from the accompanying drawings of various implementations of the disclosure. The drawings, however, should not be taken to limit the disclosure to the specific implementations, but are for explanation and understanding only.

The disclosure is illustrated by way of examples, and not by way of limitation, and may be more fully understood with references to the following detailed description when considered in connection with the figures, in which.

DETAILED DESCRIPTION

Figure 1:
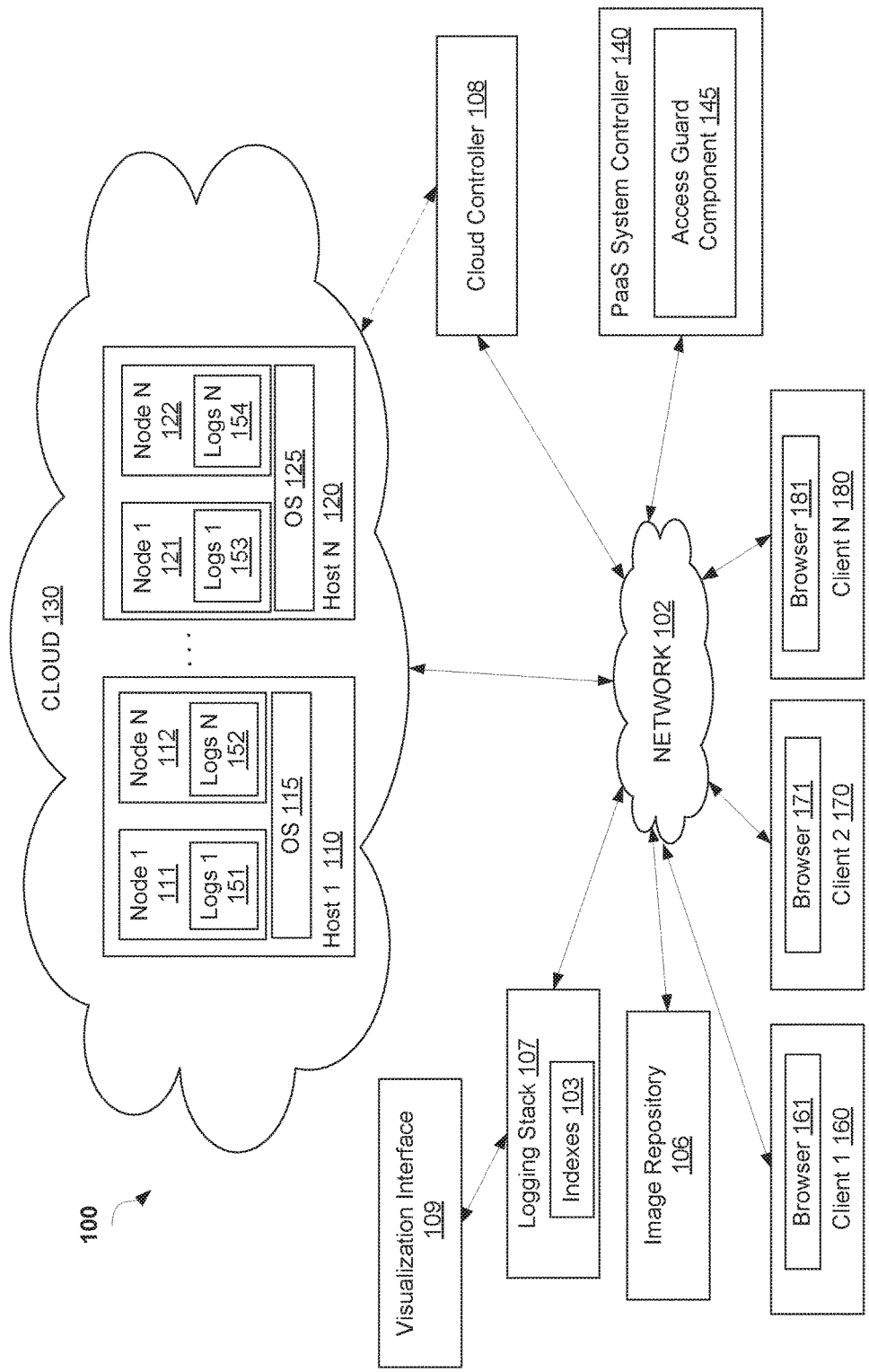
FIG. 1 is a block diagram of a network architecture in which implementations of the disclosure may operate.

The disclosure provides techniques for implementing access guards for multi-tenant logging. Many Platform-as-a-Service (PaaS) systems, such as OpenShift®, provide resources to host the execution of applications owned or managed by multiple users. A PaaS system provides a platform and environment that allow users to build applications and services over the network. A variety of PaaS system offerings exist that include software and/or hardware components for facilitating the execution of applications across many machines in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems.

Some infrastructure systems allow users to share data and work for the applications within tenants. A "tenant" is a collection of resources for running inter-related applications. The system can host a plurality of tenants on a single cluster of nodes (e.g., virtual machines). The nodes of the multi-tenant system can run multiple applications that may be owned or managed by different users and/or organizations. When an application executes, the application may produce logs that can include, but are not limited to, relevant runtime information, such as transactional, environment and system information, data, debugging and/or private code, and other types of information. Some application owners may want to allow particular users access to these logs to perform certain tasks, while limiting access to other user of the tenant or users of different organizations. This type of limited access helps ensure the confidentiality and security of the logs.

To enable access to logs, some multi-tenant systems can include a type of aggregated logging system that is implemented per tenant and/or globally within the entire system. For example, the PaaS system may utilize an object store, which is a collection of data along with metadata that describes the data and a tool, such as Elasticsearch™, to be able to examine this object store. The object store may comprise a logging stack (e.g., a data structure comprising logs and the metadata associated with the logs) that is indexed (e.g., a type of data organization that allows user to partition data a certain way) and made searchable. When the aggregated logging system is deployed on a cluster, it aggregates logs for all nodes and projects on that cluster into the logging stack. In some situations, a web-enabled UI (user interface), such as Kibana™, provides visualization capabilities on top of the indexed logs on this logging stack for users and/or administrators. The multi-tenant system, however, may be severely impacted by the overhead incurred to run the logging system for every individual tenant, as well as the administrative overhead sustained to manage logs by system administrators for each individual organization associated with the cluster.

In accordance with the disclosure, a multi-tenant logging system is provided that allows a user to have an individual profile that controls the user's access to tenant logs. This multi-tenant logging system includes an access guard plugin (e.g., a modular component that can selectivity add new features to an existing system) to a multi-tenant system, such as the PaaS system. The plugin adds features of an access control list (ACL) to indexes of the logging stack in view of a user's access role. The logging stack is an aggregate of logs for all nodes and projects on a cluster that is stored in a globally accessible location in the PaaS system. In one implementation, when a user requests a particular index to logs in the logging stack, an authorization token associated with the user is provided. Before the user request is allowed to proceed, the access guard plugin performs access control on the logging stack by referencing the ACL using the authorization token to determine which tenants a user can access in view of the user's current access role. In some implementations, the access guard plugin uses the authorization token and the user identifier to construct the ACL to enable each user's access to the logging stack. An advantage of the access guard plugin is that logs remain isolated from one another in the logging system, while still providing a common location for accessing logs across an entire cluster in view of an access role of a user that can change over time.

If the user uses a web-enabled UI to request the logs, the authorization token and user identifier are used to modify the request from the UI to perform access control on the logging stack. For example, the access guard plugin retrieves the user identifier and authorization token in view of the user's browser session, and then passes that information along as a request header with each request. As noted above, the access guard plugin uses this information to construct the logging system's ACL in view of the user's current role. In some implementations, the ACL is periodically flushed by the access guard plugin to ensure that it remains up to date with the current access roles of users defined in the multi-tenant system.

FIG. 1 is a block diagram of a network architecture in which implementations of the disclosure may operate. The network architecture 100 includes a cloud 130 that includes nodes 111, 112, 121, 122 to execute software and/or other processes. In some implementations these nodes are virtual machines (VMs) that are hosted on a physical machine, such as host 1 110 through host N 120, implemented as part of the cloud 130. In some implementations, the host machines 110, 120 are often located in a data center. For example, nodes 111 and 112 are hosted on physical machine 110 in cloud 130 provided by cloud provider 104. When nodes 111, 112, 121, 122 are implemented as VMs, they may be executed by OSs 115, 125 on each host machine 110, 120.

In some implementations, the host machines 110, 120 are often located in a data center. Users can interact with applications executing on the cloud-based nodes 111, 112, 121, 122 using client computer systems, such as clients 160, 170 and 180, via corresponding web browser applications 161, 171 and 181. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS system controller 140. In view of these commands, the cloud controller 108 provides data (such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each VM 111, 112, 121, 122. This data may be used for the execution of applications for a multi-tenant PaaS system managed by the PaaS provider controller 140.

In one implementation, the data used for execution of applications includes application images built from pre-existing application components and source code of users managing the application. An image refers to data representing executables and files of the application used to deploy functionality for a runtime instance of the application. The image build system may be provided on components hosted by cloud 130, on a server device external to the cloud 130, or even run on nodes 111, 112, 121, 122. The image build system generates an application image for an application by combining pre-existing ready-to-run application image corresponding to core functional components of the application (e.g., a web framework, database, etc.) with source code specific to the application provided by the user. The resulting application image may be pushed to an image repository (not shown) for subsequent use in launching instances of the application images for execution in the PaaS system.

Upon receiving a command identifying specific data (e.g., application data and files, such as application images, used to initialize an application on the cloud) from the PaaS provider controller 140, the cloud provider 104 retrieves the corresponding data from the image repository 106, creates an instance of the image, and loads it to the host 110, 120 for execution by nodes 111, 112, 121, 122. In addition, a command may identify specific data to be executed on one or more of the nodes 111, 112, 121, 122. The command may be received from the cloud controller 108, from the PaaS system controller 140, or a user (e.g., a system administrator) via a console computer or a client machine.

When the specific data, such as an application image, is executed at a particular node certain logs (e.g., logs 1 through N 151,152,153,154) may be produced. The logs 151,152,153,154 may comprise event data logged by an application or other types of processes. The format of these logs 151,152,153,154, can be application specific and contain relevant information regarding the runtime environment for the applications that produced the logs. In one implementation, the logs 151,152,153,154 for all the nodes 111, 112, 121, 122 may be aggregated into a logging stack 107. For example, the multi-tenant PaaS system managed by the PaaS provider controller 140 may collect these logs along with any metadata that describes the logs into a location that is globally accessible in the multi-tenant PaaS system. In some implementations, the logging stack 107 includes a plurality of indexes 103 that are in view of a plurality of different data types (e.g. categories of data).

Some users (e.g., clients 160, 170, 180 and/or administrators) request access to the logging stack 107 in order to analyze logs, and to inspect events or system incidents or detect abnormalities in the runtime environments for applications of the user. In some implementations, the users are able to run queries directly against the logging stack 107 using one or a combination of two or more indexes 103 to analyze logs. In one implementation, the users may use a visualization interface 109. For example, the visualization interface 109 may include a web-enabled portal that provides users visualization capabilities to search and analyze logs.

In one implementation, the multi-tenant PaaS system managed by the PaaS provider controller 140 may include a plugin, such as access guard component 145, that is installed to provide an individual profile for a user that controls the user's access to the logs of the logging stack 107. When a user requests access to a log on the logging stack 107, for example, by directly accessing the logging stack 107 or through the visualization interface 109, the access guard component 145 determines which indexes 103 of the stack 107 that the user is entitled to access in view of their current access role. For example, the access guard component 145 identifies an authorization token that corresponds to the user's credential (e.g., user id and password) in the system. This authorization token is used to check the current role of the user for accessing certain tenants (e.g., a collection of inter-related applications) as defined by the system. In this regard, the access guard component 145 communicates with the PaaS system controller 140 in order to add access control features for logs of the system as discussed in more detail further below with respect to FIGS. 2 through 5.

While various implementations are described in terms of the environment described above, the facility may be implemented in a variety of other environments including a single, monolithic computer system, as well as various other combinations of computer systems or similar devices connected in various ways. For example, the access guard component 145 may be running on a node of the PaaS system hosted by cloud 130, or may execute external to cloud 130 on a separate server device. In some implementations, the access guard component 145 may include more components than what is shown that operate in conjunction with the PaaS system. For example, the access guard component 145 may access an authentication utility to obtain the benefits of the techniques described herein. In another example, data from the application image may run directly on a physical host 110, 120 instead of being instantiated on nodes 111, 112, 121, 122. In some implementations, an environment other than a VM may be used to execute functionality of the PaaS applications. As such, in some implementations, a "node" providing computing functionality may provide the execution environment for an application of the PaaS system. The "node" may refer to a VM or any other type of computing environment.

Figure 2:
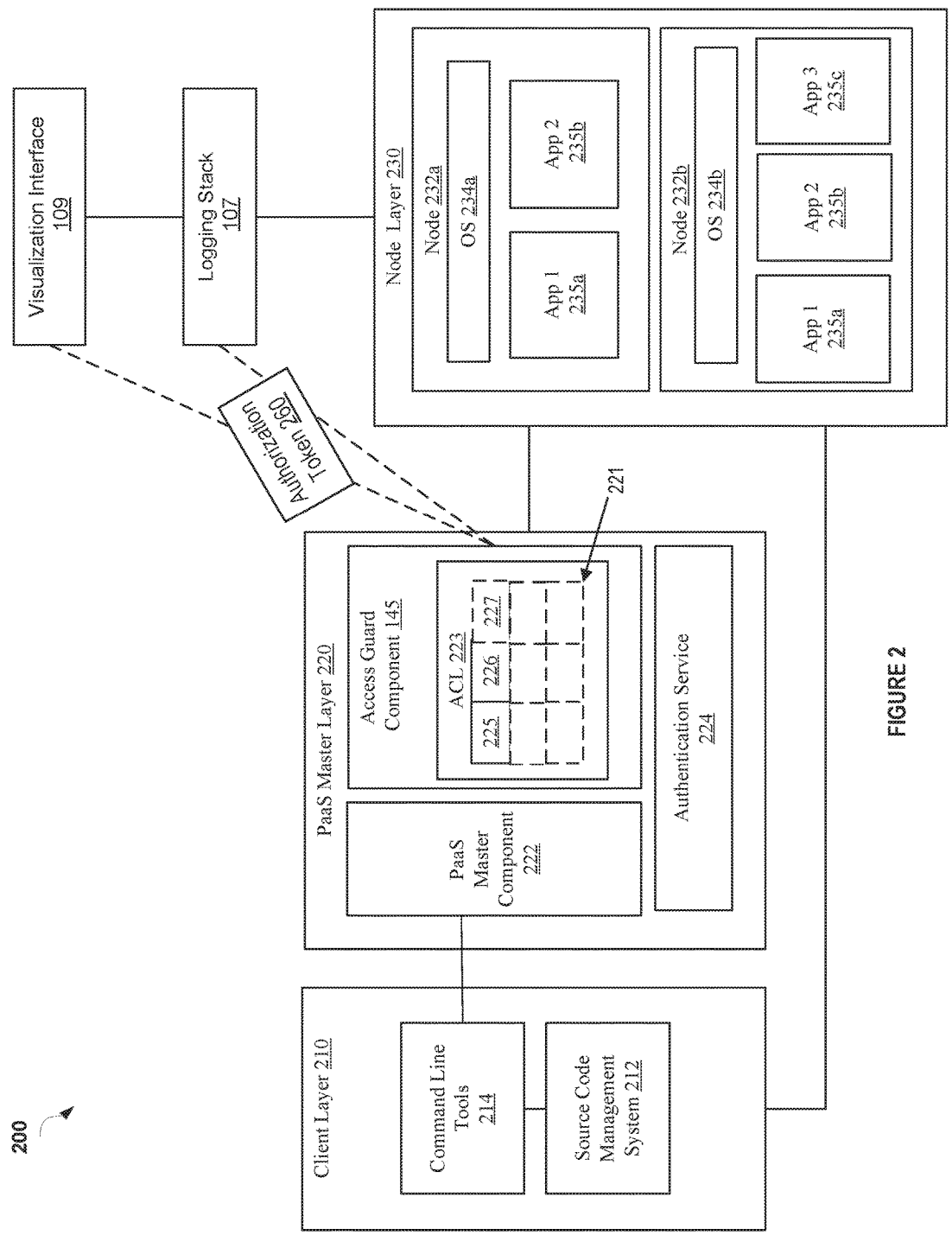
FIG. 2 is a block diagram of a Platform-as-a-Service (PaaS) system architecture according to an implementation of the disclosure.

FIG. 2 is a block diagram of a Platform-as-a-Service (PaaS) system architecture according to an implementation of the disclosure. The PaaS system architecture 200 allows users to launch software applications in a cloud computing environment, such as cloud computing environment provided in network architecture 100 described with respect to FIG. 1. The PaaS system architecture 200, in one implementation, includes a client layer 210, a PaaS master layer 220, and a node layer 230.

In one implementation, the components of the PaaS system architecture 200 are in communication with each other via a network (not shown). The network may include, for example, the Internet in one implementation. In other implementations, other networks, wired and wireless, such as an intranet, local area network (LAN), wide area network (WAN), or broadcast network may be used.

In one implementation, the client layer 210 resides on a client machine, such as a workstation of a software developer, and provides an interface to a user of the client machine to the PaaS master layer 220 and the node layer 230 of the PaaS system 200. In one implementation, the client machine can be a client 160, 170, 180 described with respect to FIG. 1. The PaaS master layer 220 may facilitate the creation and deployment on the cloud (via node layer 230) of software applications being developed by an end user at client layer 210.

In one implementation, the client layer 210 includes a source code management system 212, sometimes referred to as "SCM" or revision control system. One example of such an SCM or revision control system is Git, available as open source software. Another example of an SCM or revision control system is Mercurial, also available as open source software. Git, Mercurial, and other such distributed SCM systems typically include a working directory for making changes, and a local software repository for storing the changes for each application associated with the end user of the PaaS system 200. The packaged software application can then be "pushed" from the local SCM repository to the node(s) 232a, 232b running the associated application.

The client layer 210, in one implementation, also includes a set of command line tools 214 that a user can utilize to create, launch, and manage applications using a PaaS system. In one implementation, the command line tools 214 can be downloaded and installed on the user's client machine, and can be accessed via a command line interface or a graphical user interface, or some other type of interface. In one implementation, the command line tools 214 utilize an application programming interface ("API") of the PaaS master layer 220 and perform other applications management tasks in an automated fashion using other interfaces, as is described in more detail further below in accordance with some implementations.

In one implementation, the PaaS master layer 220 acts as middleware between the client layer 210 and the node layer 230. The node layer 230 includes the nodes 232a-b on which applications 235a– are provisioned and executed. In one implementation, each node 232a-b is a VM. In some implementations, the VMs are provisioned by an Infrastructure as a Service (IaaS) provider. In other implementations, the nodes 232a-c may be physical machines or VMs residing on a single physical machine. In one implementation, the PaaS master layer 220 is implemented on one or more machines, such as server computers, desktop computers, etc. In some implementations, the PaaS master layer 220 may be implemented on one or more machines separate from machines implementing each of the client layer 210 and the node layer 230, or may be implemented together with the client layer 210 and/or the node layer 230 on one or more machines, or some combination of the above.

In implementations of the disclosure, the PaaS system architecture 200 of FIG. 2 is a multi-tenant PaaS environment. In a multi-tenant PaaS environment, each node 232a-b runs multiple applications 235a-c that may be owned or managed by different users (e.g., owners) and/or organizations. As such, a first customer's deployed applications 235a-c may co-exist with any other customer's deployed applications on the same node 232 that is hosting the first customer's deployed applications 235a-c. In some implementations, portions of an application execute on multiple different nodes 232a-b. For example, as shown in FIG. 2, components of application 1 235a run in both node 232a and node 232b. Similarly, components of application 2 235b may run in node 232a and node 232b.

In one implementation, the PaaS master layer 220 includes a PaaS master component 222 that coordinates requests from the client layer 210 with actions to be performed at the node layer 230. Examples of the requests can include a request to create an application, a request to perform an action (e.g., creating, removing, and/or managing an application), a request to deploy source code of an application, a request to designate a system to host a remote SCM repository (e.g., an indication that a system has been designated by a user to host a remote SCM repository), etc. In one implementation, a user, using the command line tools 214 at client layer 210, can request the creation and/or execution of a new application 235a-c, deployment of source code of the application 235a-c, the designation of a system that hosts a remote SCM repository, etc.

In response to receiving such a request, the PaaS master component 222 may first authenticate the user using an authentication service 224. The authentication service 224 determines an identity of the user making the request and creates a token, such as authorization token 260, for that user. The authorization token 260 may be text passed to end user for authentication purposes. In one implementation, the authentication service 224 may comprise custom authentication methods, or standard protocols such as SAML, Oauth, etc. Once the user has been authenticated and allowed access to the PaaS system by authentication service 224, the PaaS master component 222 collects information about the nodes 232a-b. For example, the PaaS master component 222 may aggregate logs associated with the application 235a-c on nodes 232a-b into the logging stack 107. In some implementations, the logging stack 107 comprises a globally-accessible object store in the multi-tenant PaaS system 200 for storing logs and metadata for the logs. In one implementation, the logging stack 107 may be indexed in view of a plurality of different data types (e.g. categories of data) and made searchable via the indexes.

In one implementation, the multi-tenant PaaS system 200 provides a service for clients to access logs on logging stack 107 in the cloud environment. As noted above, the PaaS system 200 includes an access guard component 145 that allows users to access logs of the logging stack 107 in view of their current access role. In one implementation, the access guard component 145 utilizes the authorization token 260 associated with the user to construct an access control list (ACL) 223 for accessing the logs. The ACL 223 may be a data structure (e.g., an array, tree, list or other types of data structures) that stores a number of rows 221 with each row associated with a particular user. Each entry in a row may contain information related to that particular user, for example, the row may include an entry 225 storing a user identifier (e.g., user name), an entry 225 storing an authorization token associated with the user identifier, as well as an entry 227 to store other relevant information regarding the user's access role.

Access roles of the users grant them various levels of access to the logs on the logging stack 107. For example, the access roles can define applications that a user can access, a time frame or date that the access is allowed, as well as certain permission levels associated with the user, such as whether the user has user-level access and/or administrative access to the applications. If the user requests a specific index to the logging stack 107 associated with an application, the access guard component 145 uses information about the requesting user to determine if the request should be allowed. For example, the authorization token 260 associated with the user is identified to determine which applications the user can access in view of their access role. As noted above, the authorization token 260 is generated by the authentication service 224 at a time when the user's credentials are authenticated. The access guard component 145 then updates the ACL 223 with this information before the request is allowed to proceed.

In some implementations, the multi-tenant PaaS system 200 includes a visualization interface 109 that provides certain capabilities in addition to indexing the log content on the logging stack 107. In this regard, all request to access the logging 107 are handled by the access guard component 145 no matter whether the request originates from the visualization interface 109 or directly against the logging stack 107. If the visualization interface 109 is used to access the logs, the access guard component 145 retrieves the authorization token 260 and user identifier associated with the user's client (e.g., web browser session). For example, when a user provides credentials in the browser session to log into the PaaS system 200, the authorization token is identified by the PaaS system 200 in view of these credentials and passed along to the access guard component 145.

In one implementation, the user request may be modified or otherwise rewritten to incorporate the access role of the user. For example, the access guard component 145, after determining the authorization token and user identifier associated with the request, appends this information to a request header associated with the request. The request is then transformed to use an index that is unique for the user requesting the logs and is separate from indices generated for other users. This index is in view of the particular user's access role profile that is identified by using the authorization token sent with the modified request. Then, the access guard component 145 applies the index to the logging stack 107 to select logs that correspond to applications the user is allowed to access in view of the information retrieved from the ACL 223. Thereupon, the portions of the logs associated with these applications are identified in the logging stack 107 and provided to the user for analyses. If the user requests an index that the user is not allowed to access, the access guard component 145 may generate an error message indicating that the request is denied.

To ensure that the ACL 223 is kept up-to-date with the current access roles of the users, the access guard component 145 may at times remove certain entries 221 from the ACL 223. In some implementations, the ACL 223 is periodically cleared out by the access guard component 145 to ensure it remains up to date or otherwise in sync with the access roles of users defined in the PaaS system 200. For example, the ACL 223 is constructed as users make request to view certain logs although some users (e.g., administrators) may be persistently added to the ACL. If the same user keeps making requests, that user's information remains on the ACL 223. If a certain period of time is passed (e.g., a time threshold of minutes, hours, days etc.) since the user made a request that added their authorization to the ACL 223, the access guard component 145 may remove the user's information from the ACL 223. If the user's access role has been changed (e.g., by an administrator or tenant owner), the next time the user makes a request to access the logs the user's updated role is reflected on the ACL 223 when the user's updated authorization token is added. Thus, the user may no longer have access to logs that they were able to previously access or they may now have access to additional logs in view of their new access role.

Figure 3:
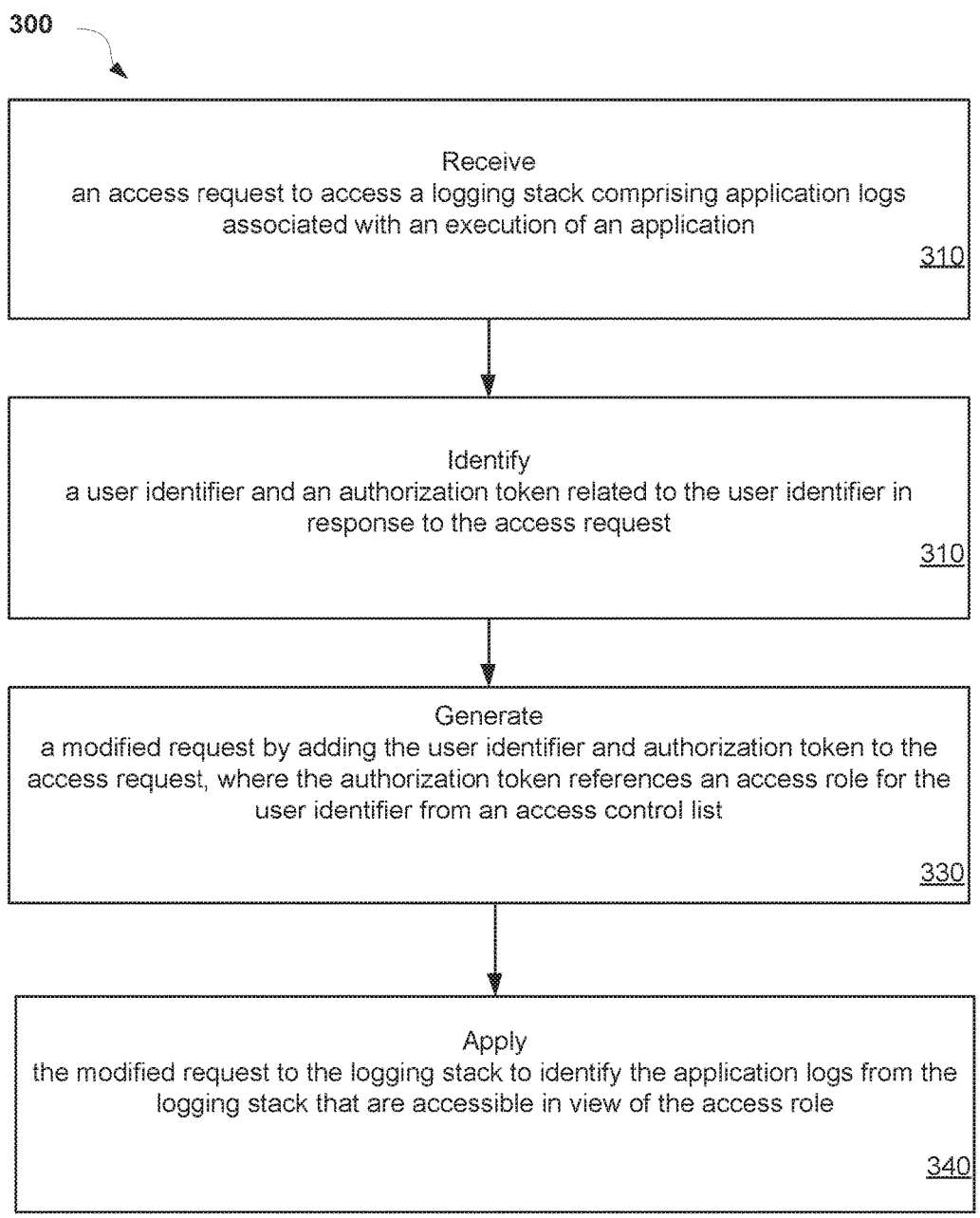
FIG. 3 illustrates a flow diagram of a method of providing access guards for multi-tenant logging according to an implementation of the disclosure.

FIG. 3 illustrates a flow diagram illustrating a method of providing access guards for multi-tenant logging according to an implementation of the disclosure. In one implementation, the access guard component 145 of FIG. 1 may perform method 300. The method 300 may be performed by processing logic that may comprise hardware (circuitry, dedicated logic, etc.), software (e.g., software executed by a general purpose computer system or a dedicated machine), or a combination of both. In alternative implementations, some or all of the method 300 may be performed by other components of a multi-tenant system. It should be noted that blocks depicted in FIG. 3 can be performed simultaneously or in a different order than that depicted.

Method 300 begins at block 310 where a request to access a logging stack comprising application logs associated with an execution of an application is received. For example, a client associated with client layer 210 of FIG. 2 may request access to the logging stack 107 of Paas System 200. In block 320, a user identifier and an authorization token related to the user identifier is identified in response to the access request. For example, this information may be identified in view of a browser session associated with the client layer

210. A modified request is generated in block 330 in view of the access request. For example, the access request received in block 310 can be rewritten to include the user identifier and authorization token. In this regard, the authorization token references an access role for the user identifier from an access control list. In block 340, the modified request is applied to the logging stack to identify the application logs from the logging stack that are accessible in view of the access role.

Figure 4:
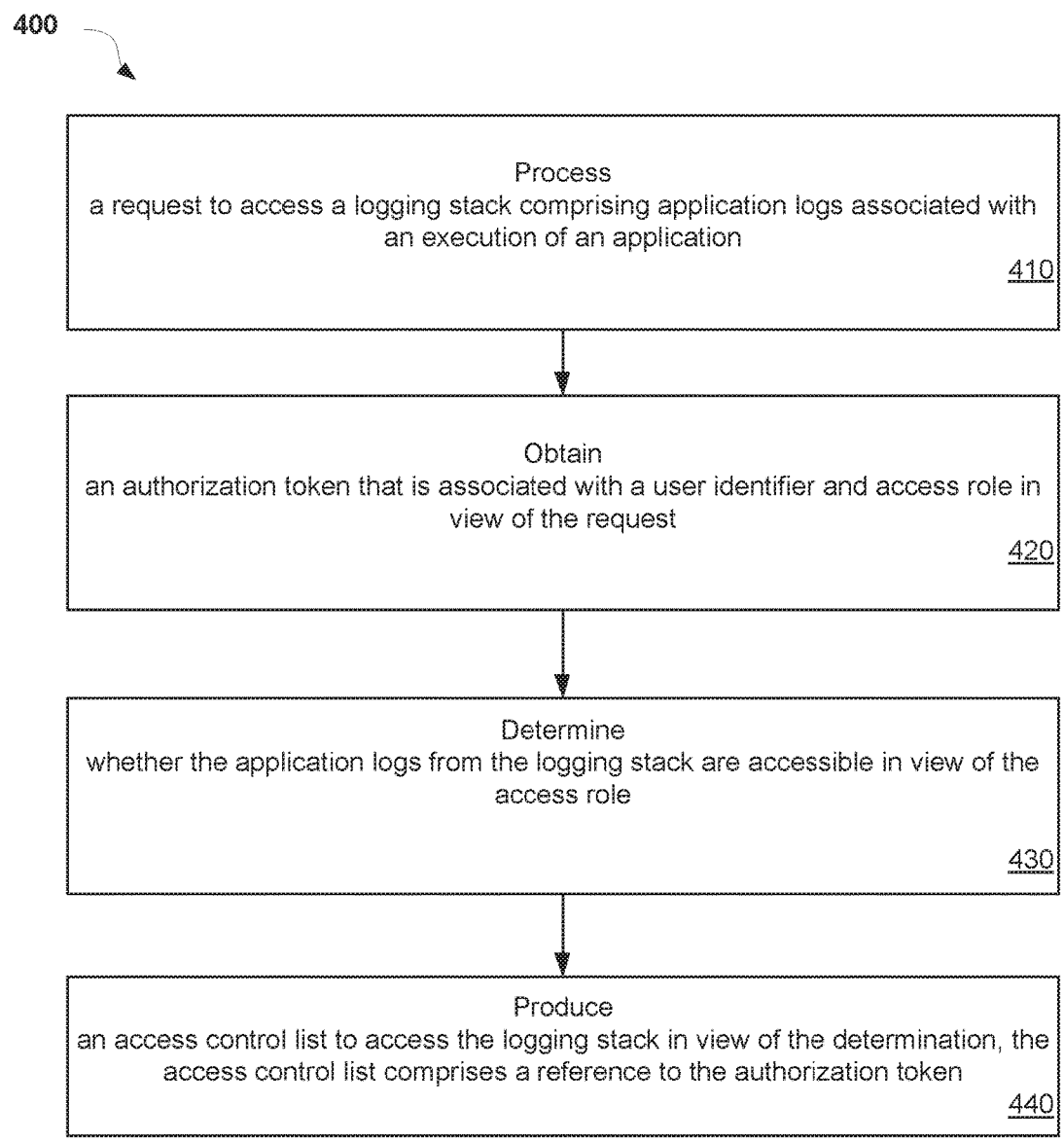
FIG. 4 illustrates a flow diagram of a method to generate an access control list for multi-tenant logging according to an implementation of the disclosure.

FIG. 4 illustrates a flow diagram of a method to generate an access control list for multi-tenant logging according to an implementation of the disclosure. In one implementation, the access guard component 145 of FIG. 1 may perform method 400. The method 400 may be performed by processing logic that may comprise hardware (circuitry, dedicated logic, etc.), software (e.g., software executed by a general purpose computer system or a dedicated machine), or a combination of both. In alternative implementations, some or all of the method 400 may be performed by other components of a PaaS system. It should be noted that blocks depicted in FIG. 4 can be performed simultaneously or in a different order than that depicted.

Method 400 begins at block 410 where a request to access a logging stack comprising application logs associated with an execution of an application is processed. An authorization token that is associated with a user identifier and access role is obtained in view of the request in block 420. A determination as to whether the application logs from the logging stack are accessible in view of the access role is made in block 430. In block 440, an access control list to access the logging stack in view of the determination is produced. In this regard, the access control list comprises a reference to the authorization token.

Figure 5:
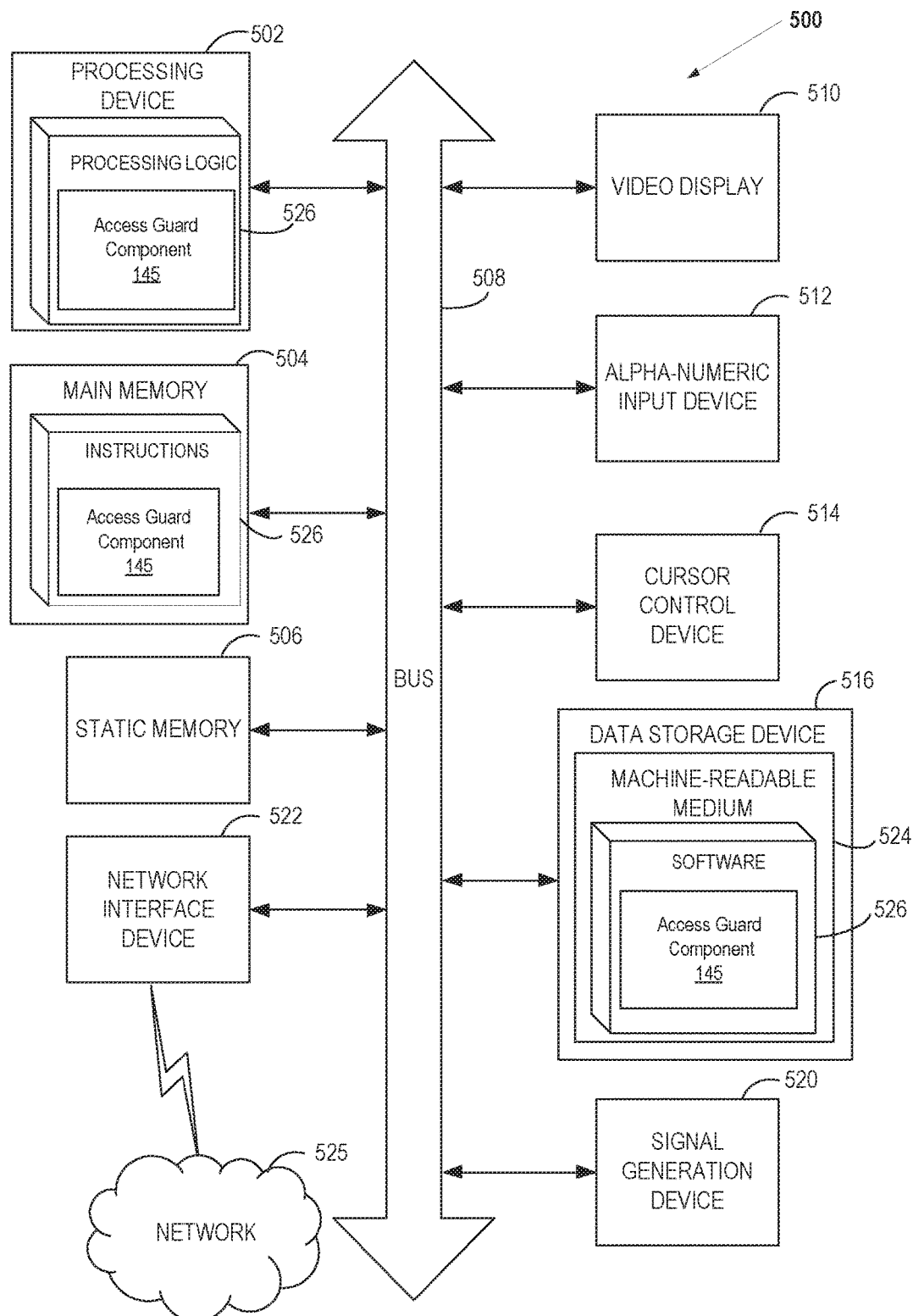
FIG. 5 illustrates a block diagram illustrating a computer system in which implementations of the disclosure may be used.

FIG. 5 illustrates a diagrammatic representation of a machine in the example form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 508.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is to execute the processing logic 526 for performing the operations and steps discussed herein.

The computer system 500 may further include a network interface device 522 communicably coupled to a network 564. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a non-transitory machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The non-transitory machine-readable storage medium 524 may also be used to store instructions 526 to implement an access guard component 145 to provide access guards for multi-tenant logging in a system, such as the PaaS system described herein, and/or a software library containing methods that call the above applications. While the machine-accessible storage medium 524 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

It is to be understood that the above description is intended to be illustrative, and not restrictive. Many other implementations are apparent upon reading and understanding the above description. The scope of the disclosure should, therefore, be determined with reference to the appended claims, along with the full scope of equivalents to which such claims are entitled.

In the above description, numerous details are set forth. It is apparent, however, that the disclosure may be practiced without these specific details. In some instances, structures and devices are shown in block diagram form, rather than in detail, in order to avoid obscuring the disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "receiving", "determining", "identifying", "generating", "applying", "processing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems appears as set forth in the description below. In addition, the disclosure is not described with reference to any particular programming language. It is appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
receiving, by a processing device, an access request to access a logging stack comprising application logs, wherein the access request identifies a user identifier;
identifying, by the processing device, an authorization token associated with the user identifier, wherein the authorization token references an access role; and
generating, by the processing device, an access control list identifying application logs of the logging stack that are accessible in view of the access role.

2. The method of claim 1, further comprising providing a portion of the application logs associated with execution of an application in view of the access role.

3. The method of claim 1, wherein the authorization token is identified in view of a browser session associated with the access request.

4. The method of claim 1, further comprising generating an index for the logging stack in view of the access request, the index to reference the application logs accessible by the user identifier.

5. The method of claim 4, further comprising providing access to the application logs in accordance with a service in a cloud environment.

6. The method of claim 1, further comprising syncing a current access role associated with the user identifier with the access role referenced by the authorization token from the access control list.

7. The method of claim 6, wherein the syncing comprises, responsive to detecting that a time threshold is satisfied, removing the access role referenced by the authorization token from the access control list.

8. A system comprising:
a memory storing an access control list; and
a processing device, operatively coupled to the memory, to:
receive an access request to access a logging stack comprising application logs, wherein the access request identifies a user identifier;
identify an authorization token associated with the user identifier, wherein the authorization token references an access role; and
generate an access control list identifying application logs of the logging stack that are accessible in view of the access role.

9. The system of claim 8, wherein the processing device is further to provide a portion of the application logs associated with execution of an application in view of the access role.

10. The system of claim 8, wherein the authorization token is identified in view of a browser session associated with the access request.

11. The system of claim 8, wherein the processing device is further to generate an index for the logging stack in view of the access request, the index to reference the application logs accessible by the user identifier.

12. The system of claim 11, wherein the processing device is further to provide access to the application logs in accordance with a service in a cloud environment.

13. The system of claim 8, wherein the processing device is further to sync a current access role associated with the user identifier with the access role referenced by the authorization token from the access control list.

14. The system of claim 13, wherein to sync, the processing device is further to, responsive to detecting that a time threshold is satisfied, remove the access role referenced by the authorization token from the access control list.

15. A non-transitory computer-readable storage medium comprising executable instructions that when executed, by a processing device, cause the processing device to:
- receive, by the processing device, an access request to access a logging stack comprising application logs, wherein the access request identifies a user identifier;
- identify an authorization token associated with the user identifier, wherein the authorization token references an access role; and
- generate an access control list identifying application logs of the logging stack that are accessible in view of the access role.

16. The non-transitory computer-readable storage medium of claim 15, wherein the processing device is further to provide a portion of the application logs associated with execution of an application in view of the access role.

17. The non-transitory computer-readable storage medium of claim 15, wherein the authorization token is identified in view of a browser session associated with the access request.

18. The non-transitory computer-readable storage medium of claim 15, wherein the processing device is further to generate an index for the logging stack in view of the access request, the index to reference the application logs accessible by the user identifier.

19. The non-transitory computer-readable storage medium of claim 18, wherein the processing device is further to provide access to the application logs in accordance with a service in a cloud environment.

20. The non-transitory computer-readable storage medium of claim 15, wherein the processing device is further to sync a current access role associated with the user identifier with the access role referenced by the authorization token from the access control list.

* * * * *